United States Patent [19]

Gunter et al.

[11] Patent Number: 4,485,217

[45] Date of Patent: Nov. 27, 1984

[54] METHOD FOR REDUCING SHRINKAGE OF INJECTION MOLDED LINEAR LOW DENSITY POLYETHYLENE

[75] Inventors: Harvey R. Gunter, Bridge City; Gary L. Stutzman, Woodlands, both of Tex.; Stephen G. Salerno, Lawrenceville, N.J.

[73] Assignee: Mobil Oil Corporation, New York, N.Y.

[21] Appl. No.: 484,732

[22] Filed: Apr. 13, 1983

[51] Int. Cl.$^3$ .................. C08L 23/06; C08L 23/08; C08L 23/18
[52] U.S. Cl. .................. 525/240; 264/328.1; 264/331.17
[58] Field of Search .................. 525/240; 264/331.17

[56] References Cited

U.S. PATENT DOCUMENTS

| | | | |
|---|---|---|---|
| 3,176,052 | 3/1965 | Peticolas | 525/240 |
| 4,076,698 | 2/1978 | Anderson et al. | 526/348.6 |
| 4,205,021 | 5/1980 | Morita et al. | 525/240 |
| 4,243,619 | 1/1981 | Fraser et al. | 264/40.6 |
| 4,337,188 | 6/1982 | Climenhage et al. | 524/140 |
| 4,339,507 | 7/1982 | Kurtz et al. | 428/522 |

FOREIGN PATENT DOCUMENTS 566071 11/1958 Canada.
2019412 10/1979 United Kingdom.

*Primary Examiner*—Carman J. Seccuro
*Attorney, Agent, or Firm*—Alexander J. McKillop; Michael G. Gilman; Edward J. Trojnar

[57] ABSTRACT

Shrinkage following injection molding of linear low density polyethylene, e.g. copolymers of ethylene and butene, is reduced by intimately blending high pressure low density polyethylene in minor amounts, e.g. 3 to 50 weight percent of the polymers.

7 Claims, No Drawings

METHOD FOR REDUCING SHRINKAGE OF INJECTION MOLDED LINEAR LOW DENSITY POLYETHYLENE

BACKGROUND OF THE INVENTION

Injection molded linear low density polyethylene produces articles with improved toughness and environmental stress crack resistance, and can be prepared with shorter molding cycles than possible with conventional high pressure low density polyethylene. However, in injecting molding shrinkage of the linear low density polyethylene is found to be excessive compared with conventional polyethylene. In accordance with this invention high pressure low density polyethylene in minor amounts is blended with the linear low density polyethylene to reduce shrinkage to acceptable levels similar to that of conventional high pressure low density polyethylene.

BRIEF SUMMARY OF THE INVENTION

This invention relates to linear low density polyethylene compositions containing a minor amount of high pressure low density polyethylene and more specifically to the use of such compositions in injection molding to reduce the shrinkage which is observed when linear low density polyethylene is injection molded.

DETAILED DESCRIPTION OF THE INVENTION

An essential component of the injection molding resins of this invention is linear low density polyethylene (LLDPE) which is the term applied to copolymers of ethylene and higher olefins, having a density of less than about 0.94. Such materials are commericially available. Their preparation is also described in U.S. Pat. No. 4,076,698 and 4,205,221, for example, both of which are incorporated herein by reference. Representative linear low density polyethylenes disclosed in patents and available in the prior art comprise copolymers of ethylene and higher alpha olefins, in particular, copolymers of ethylene and olefins containing 4 to 8 carbon atoms. The linear low density polymers which are particularly suitable for this invention have a relatively high melt index (MI) of 30 to 150, and preferably from about 30 to 70. The density of the polymers is generally below about 0.94 and preferably in the range of about 0.91 to 0.93.

A second essential component of the resin blends of this invention is a conventional low denisty polyethylene (HPPE) which is prepared by high pressure techniques using free radical initiation. In general the conventional polyethylene has a density of 0.91 to 0.94.

Certain blends of linear low density polyethylenes and conventional polyethylenes are disclosed in U.S. Pat. No. 3,176,052 which is incorporated herein by reference. This patent is primarily concerned with obtaining better film properties from the blends and discloses that optical properties, particularly gloss, is improved with the blends compared to linear low density polyethylene itself. There is no disclosure or suggestion that reduced shrinkage of injection molded parts can be obtained with blends as disclosed herein. Indeed, the linear low density polyethylenes specified in this patent have a melt index which is from 0.01 to 10 and considerably lower than preferred for use in this invention.

The blends suitable for use in this invention comprise up to about 50 weight percent of high pressure low density polyethylene, the remainder being linear low density copolymer of ethylene and a higher olefin. Generally, the conventional high pressure resin comprises from 3 to 30 weight percent of the composition but preferably from about 3 to 6 weight percent. The blending of the polymers can be accomplished in many ways familiar to those skilled in the art. A physical mixture of the two polymers in powder or pellet form is suitable for use in the injection molding apparatus. However, the benefits of blending are best achieved if the two resins are intimately mixed by milling or hot compounding above the melting point of the higher melting mixture. Thus, a homogeneous blend is decidedly preferable in the practice of this invention.

The benefits of reduced shrinkage are particularly realized in the injection molding of parts to close tolerances. For example, in the production of lids for containers a shrinkage variation of several mils may result in a poor fit. Thus, the compositions of this invention enable one to obtain the benefits of the excellent physical properties of linear low density polyethylene, and at the same time avoid the disadvantage of its relatively poor shrinkage characteristics. The benefits are realized when the same molds which were previously used for injection molding of parts from conventional low pressure polyethylene are used with linear low density polyethylene.

Shrinkage in accordance with this invention is measured on injection molded parts in which dimensions are compared shortly after molding and several days later when it is assumed that substantially maximum shrinkage has occurred. Typically, shrinkage is measured using a circumferential gauge such as manufactured by the Starrett Corporation.

The shrinkage observed upon injection molding of the LLDPE/HPPE blends of this invention depends on many factors such as the method of blending and cycle time. However, shrinkage with the blends generally is 75–50 percent or less than that observed with LLDPE alone, and approaching the acceptably low shrinkage with HPPE alone. It is surprising that relatively low amounts of HPPE, e.g. 5 weight percent, have such a profound effect on the shrinkage of the molded parts.

The invention is illustrated in the following non limiting example in which all parts are by weight.

EXAMPLE

Linear high flow low density polyethylene (LLDPE) (Union Carbide GRSN-7147, a copolymer of ethylene and butene) having a Melt Index (MI) of 50 and a density of 0.926 was injection molded into a container lid having a diameter of about 6.03 inches using 6.1 and a 7.1 second molding cycles. In a similar manner moldings were made using blends of the same linear low density polyethylene and 5 weight percent of a conventional high pressure low density polyethylene (HPPE) (Mobil LPA-002), MI-25, density 0.918. In one case a physical mixture of pellets of the two polyethylene resins was fed to the injection molding extruder. In the second case an intimate melt blend of the resins was prepared prior to feeding to the injection molding apparatus. Another molding was made using another conventional high pressure polyethylene (Gulf 1410), MI 35, density 0.923.

The circumference of the injection molded lids was measured after 1 hour and again after 6 days, and the difference recorded. The results are summarized in the Table below.

TABLE

| LLDPE | HPPE | Blend Method | Shrink Difference (Mils) | |
| --- | --- | --- | --- | --- |
| | | | (6.1 sec. cycle) | (7.1 sec. cycle) |
| 100 | 0 | — | 8 | — |
| 95 | 5 | Physical | 5.3 | 4.4 |
| 95 | 5 | Hot Compounded | 4.7 | 2.6 |
| 0 | 100 | — | 4 | 2.4 |

*Gulf 1410

We claim:

1. A method for injection molding articles from a linear low density copolymer of ethylene and higher olefins having a density of less than 0.94 and a melt index of 30 to 150 in which shrinkage is reduced by blending said linear low density copolymer with an effective amount of from 3 to 15 weight percent based on the total weight of the blend, of a high pressure low density polyethylene, and injection molding said blend.

2. The method of claim 1 in which said high pressure polyethylene comprises about 4 to 8 weight percent of said blend.

3. The method of claim 1 in which said linear low density copolymer has a melt index of 30 to 70.

4. The method of claim 1 in which said linear low density ethylene copolymer has a density of 0.91 to 0.93.

5. The method of claim 1 in which said linear low density ethylene copolymer is a copolymer of ethylene and an olefin containing 4 to 8 carbon atoms, and having a density of from 0.91 to 0.93.

6. The method of claim 1 in which said linear low density ethylene copolymer is a copolymer of ethylene and butene having a density of 0.91 to 0.93.

7. The method of claim 1 in which said linear low density ethylene copolymer is a copolymer of ethylene and an olefin containing 4 to 8 carbon atoms, having a density of 0.91 to 0.93 and a melt index of 30 to 150.

* * * * *